Figures 1, 2, 3, 4, 5:
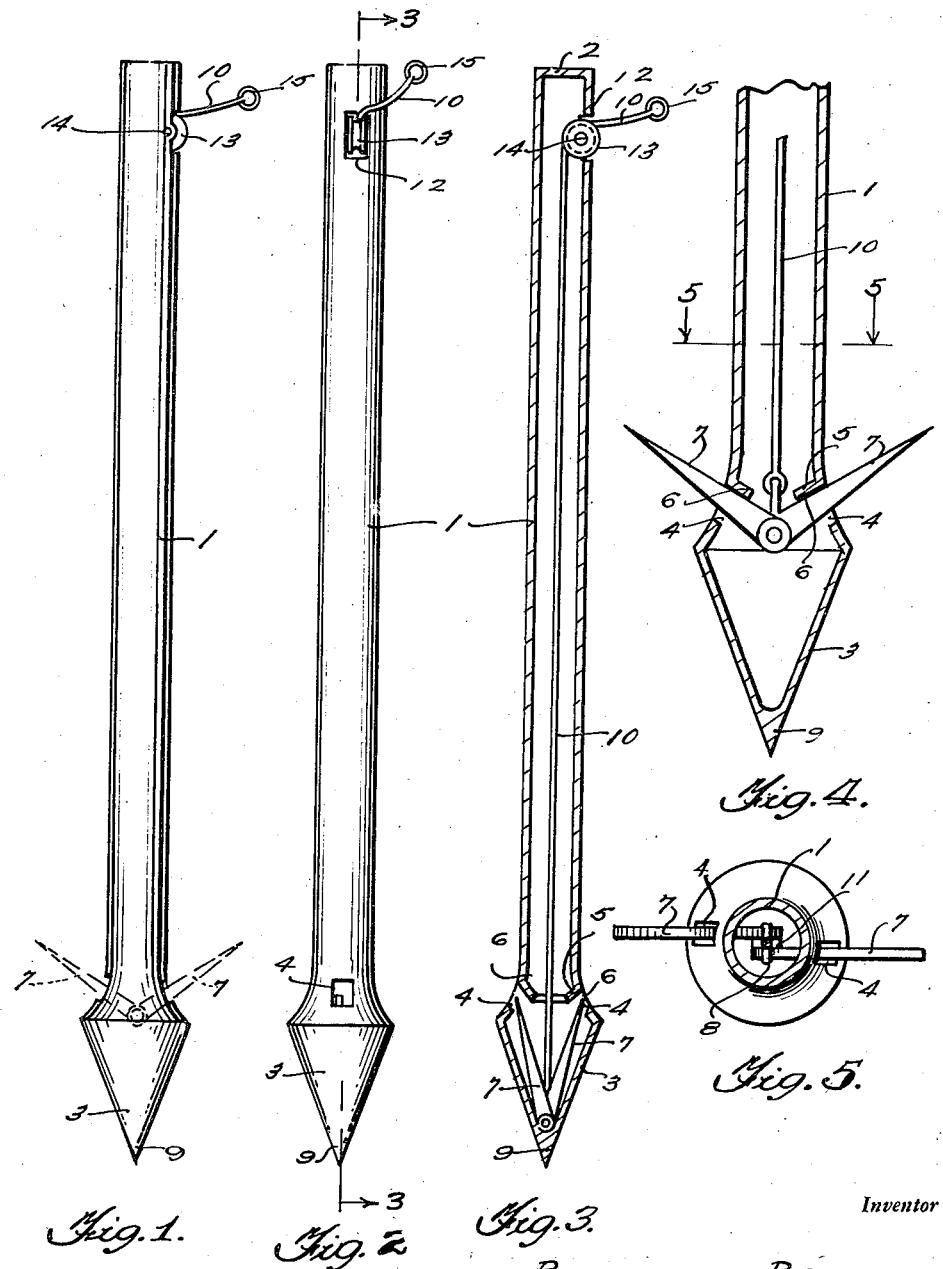

Jan. 9, 1945.　　　　B. BRAND　　　　2,366,997

GROUND STAKE

Filed April 14, 1944

Inventor

BENJAMIN BRAND,

By Clarence A. O'Brien
and Harvey B. Jacobson
Attorneys

Patented Jan. 9, 1945

2,366,997

UNITED STATES PATENT OFFICE 2,366,997

GROUND STAKE

Benjamin Brand, Minot, N. Dak.

Application April 14, 1944, Serial No. 531,073

2 Claims. (Cl. 189—92)

My invention relates to improvements in ground stakes, the primary object in view being to provide a simply constructed, inexpensive stake equipped with anchoring means operative by a pull cord, or cable, to be projected laterally of the stake and upwardly into the ground by pull exerted on the cord or cable through an object, such as guy wire, or the like, attached to the cord or cable.

Other, and subordinate, objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation of my improved ground stake, in its preferred embodiment, with the flukes projected in dotted line, Figure 2 is a similar view with the stake turned at a 90° angle relative to its position as shown in Figure 1, Figure 3 is a view in longitudinal section taken on the line 3—3 of Figure 2, Figure 4 is a fragmentary similar view showing the flukes projected, and drawn to an enlarged scale, Figure 5 is a view in transverse section taken on the line 5—5 of Figure 4.

Referring to the drawing by numerals, my improved ground stake, as illustrated, comprises a tubular shank 1 closed at its butt end, as at 2, and provided with an enlarged, conical, hollow leading end 3 for driving into the ground. The leading end 3 is completely closed with the exception of a pair of diametrically opposite apertures 4 formed in said end at its juncture with the shank 1. A transverse, axially apertured, tapered partition 5 in the shank 1 provides rearwardly, or upwardly, flaring abutment rear walls 6 for the apertures 4.

A pair of rearwardly, or upwardly, tapered, bar-like flukes 7 are pivoted together, as at 8, at their larger ends to rest, at said larger ends, in the pointed portion 9 of said leading end 3 with free sharp ends extending into the apertures 4.

A pull cord, or cable, 10 is attached in any suitable manner at one end, as indicated at 11, to the pivot 8 of said flukes and extended upwardly through the partition 5 into the shank 1 with its other, or free, end extended out of a side aperture 12 provided in the shank 1 near the butt end thereof, said cord being trained over a pulley 13 extending into the aperture 12 and rotatably mounted on a cross pin 14 in the shank 1. The free end of the cord 10 is provided with a ring 15 for the attachment to the cord 10 of a guy wire, tent rope, or any other object exerting a pull on said cord.

The use and operation of my improved ground stake will be readily understood. The leading end 3 of the stake is driven into the ground for a suitable distance. Under pull on the cord 10 by an object attached thereto, such as previously specified, the pair of flukes 7 are lifted bodily in the leading end 3 against the relatively divergent walls 6 of the apertures 4 which function to cam said flukes into upwardly divergent relation as said flukes are forced into the ground by the pull on said cord 10. By releasing the pull on the cord 10 and pushing the leading end 3 into the ground, the flukes 7 may be caused to be retracted into the leading end 3 in the described normal position of the flukes.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a ground stake, a tubular shank having a closed butt end and an enlarged conical hollow leading end adapted to be driven into the ground and provided at its juncture with said shank with a pair of upwardly opening apertures upon opposite sides thereof, a forwardly tapered axially apertured transverse partition in said shank forming rearwardly flaring upper walls for said apertures, a pair of tapered flukes in said leading end having larger ends pivoted together and adapted to rest in the pointed portion of said leading end with the smaller ends thereof projecting into the apertures of said pair respectively, and a pull cord attached to the pivot of said flukes and extended through said axial aperture and shank and out of the side of said shank adjacent said butt end.

2. In a ground stake, a tubular shank having a closed butt end and an enlarged conical hollow leading end adapted to be driven into the ground and provided at its juncture with said shank with a pair of upwardly opening apertures upon opposite sides thereof, a forwardly tapered axially apertured transverse partition in said shank forming rearwardly flaring upper walls for said apertures, a pair of tapered flukes in said leading end having larger ends pivoted together and adapted to rest in the pointed portion of said leading end with the smaller ends thereof projecting into the apertures of said pair respectively, and a pull cord attached to the pivot of said flukes and extended through said axial aperture and shank and out of the side of said shank adjacent said butt end, said shank having a side aperture for the extension of said cord out of the shank, and a pulley mounted in said aperture over which the cord is trained.

BENJAMIN BRAND.